(12) United States Patent
Han et al.

(10) Patent No.: US 11,060,436 B2
(45) Date of Patent: Jul. 13, 2021

(54) EXHAUST HEAT RECOVERY APPARATUS

(71) Applicants: Hyundai Motor Company, Seoul (KR); Kia Motors Corporation, Seoul (KR)

(72) Inventors: Yu Ri Han, Chungcheongbuk-Do (KR); Hong Jae Kim, Gyeonggi-Do (KR); Ju Hyuck Lee, Gyeongsangbuk-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/981,043

(22) Filed: May 16, 2018

(65) Prior Publication Data

US 2019/0128169 A1 May 2, 2019

(30) Foreign Application Priority Data

Oct. 30, 2017 (KR) .................. 10-2017-0142178

(51) Int. Cl.
*F01N 3/10* (2006.01)
*F01N 5/02* (2006.01)
(Continued)

(52) U.S. Cl.
CPC ............. *F01N 5/02* (2013.01); *F01N 3/0205* (2013.01); *F01N 3/043* (2013.01); *F01N 3/10* (2013.01);
(Continued)

(58) Field of Classification Search
CPC . F01N 5/02; F01N 13/08; F01N 3/043; F01N 13/1805; F01N 3/10; F01N 3/0205;
(Continued)

(56) References Cited

U.S. PATENT DOCUMENTS 2,204,294 A * 6/1940 Blanchard ............... F01N 13/08
261/159
3,725,565 A * 4/1973 Schmidt ................. H01B 12/00
174/13
(Continued)

FOREIGN PATENT DOCUMENTS

| CN | 2858964 Y | 1/2007 |
| CN | 103821603 A | 5/2014 |
| CN | 204113419 U | 1/2015 |

OTHER PUBLICATIONS

Murata, et al., "Efficiency Improvement in Exhaust Heat Recirculation System," SAE Technical Paper, 2016-01-0184, Apr. 5, 2016 (doi:10.4271/2016-01-0184).
(Continued)

*Primary Examiner* — Jason D Shanske
(74) *Attorney, Agent, or Firm* — Mintz Levin Cohn Ferris Glovsky and Popeo, P.C.; Peter F. Corless

(57) ABSTRACT

An exhaust heat recovery apparatus is installed proximate an engine and at a front side of a warm-up catalytic converter in an exhaust system, where the exhaust system includes an exhaust line connected with the engine, and the warm-up catalytic converter is installed at the exhaust line. The exhaust heat recovery apparatus includes a bellows unit which is of a dual-pipe type and exchanges heat between exhaust gas emitted through the exhaust line and coolant circulating from a cooling system to the engine.

15 Claims, 11 Drawing Sheets

(51) Int. Cl.
  *F01N 13/18*   (2010.01)
  *F01N 3/02*    (2006.01)
  *F01N 13/08*   (2010.01)
  *F01N 3/04*    (2006.01)

(52) U.S. Cl.
  CPC ......... *F01N 13/08* (2013.01); *F01N 13/1805* (2013.01); *F01N 2240/20* (2013.01); *F01N 2240/36* (2013.01); *F01N 2260/024* (2013.01); *F01N 2410/06* (2013.01); *F01N 2470/04* (2013.01); *F01N 2470/08* (2013.01); *F01N 2470/12* (2013.01); *F01N 2470/24* (2013.01); *F01N 2900/08* (2013.01); *F01N 2900/1404* (2013.01)

(58) Field of Classification Search
  CPC ............. F01N 2470/24; F01N 2470/12; F01N 2470/08
  USPC ............................................. 60/300
  See application file for complete search history.

(56) References Cited

U.S. PATENT DOCUMENTS

| 3,934,618 | A  | * | 1/1976  | Henderson | F16L 9/18 138/114 |
| 4,940,434 | A  | * | 7/1990  | Kiesling  | B63H 20/245 440/57 |
| 5,011,194 | A  | * | 4/1991  | Nitta     | F01N 13/1811 285/123.1 |
| 6,315,332 | B1 | * | 11/2001 | Aschoff   | F01N 13/1816 285/226 |
| 7,018,255 | B1 | * | 3/2006  | Phillips  | B63H 20/08 440/89 R |
| 2005/0242577 | A1 | * | 11/2005 | Baumann | F01N 13/1805 285/226 |
| 2006/0054381 | A1 | * | 3/2006  | Takemoto | F28D 7/103 181/237 |
| 2010/0043413 | A1 | * | 2/2010  | Orihashi | F01N 13/1805 60/320 |
| 2015/0076814 | A1 | * | 3/2015  | Lucky    | F01N 13/1816 285/226 |
| 2019/0048780 | A1 | * | 2/2019  | Cho      | F01N 13/1816 |

OTHER PUBLICATIONS

Magnetto, "Waste Heat Recovery opportunities/technologies," Centro Ricerche Fiat, Nov. 20, 2010, 25 pages.

Choung et al., "An Experimental Study on the Exhaust Heat Recovery Device for the Engine Fast Warm-up," DBPIA, Fast Warm-up, The Korean Society of Automotive Engineers, (2010), 7 pages.

* cited by examiner

FIG. 6
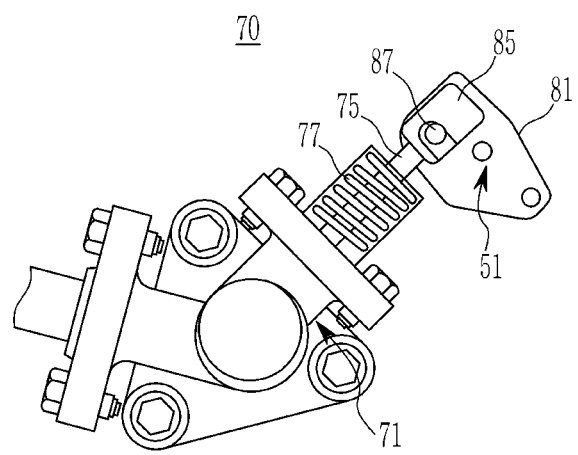
(a)
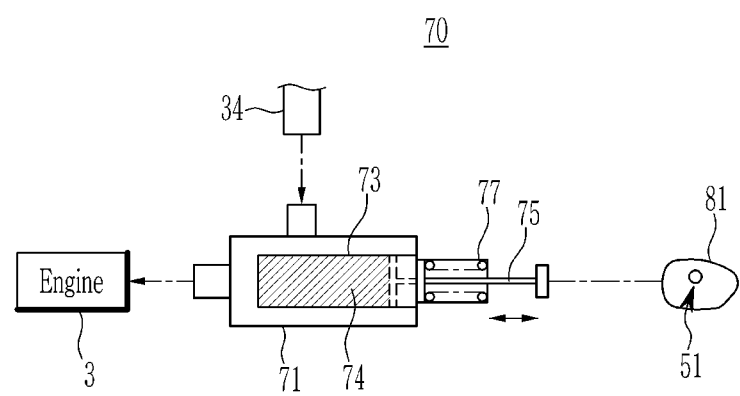
(b)

EXHAUST HEAT RECOVERY APPARATUS

CROSS-REFERENCE TO RELATED APPLICATION

This application claims under 35 U.S.C. § 119(a) the benefit of Korean Patent Application No. 10-2017-0142178 filed in the Korean Intellectual Property Office on Oct. 30, 2017, the entire contents of which are incorporated herein by reference.

BACKGROUND

(a) Technical Field

The present disclosure relates to an exhaust system for vehicles, more particularly, to an exhaust heat recovery apparatus for reducing warm-up time of coolant by heat exchange between exhaust gas and the coolant during initial cold start.

(b) Description of the Related Art

Generally, an exhaust system for vehicles is provided for emitting exhaust gas generated from an engine to a rear side of a vehicle body through an exhaust pipe. The exhaust system for vehicles includes a bellows, a warm-up catalytic converter, and a muffler installed at an exhaust pipe along exhaust path of exhaust gas.

In particular, the bellows absorbs exhaust vibration delivered from the engine.

The warm-up catalytic converter eliminates harmful components such as NOx included in the exhaust gas during initial engine starting. Further, the muffler (center muffler) reduces exhaust noise by raising exhaust resistance of the exhaust gas.

In addition, the exhaust system for vehicles includes the exhaust heat recovery apparatus for recovering exhaust heat by raising coolant temperature through heat exchange between high temperature exhaust gas generated in combustion process and low temperature coolant during initial cold start. The exhaust heat recovery apparatus can reduce warm-up time of the coolant during cold start to decrease exhaust gas and improve fuel efficiency.

The exhaust heat recovery apparatus usually blocks a main flow passage of exhaust gas by an exhaust flap during initial cold start, bypasses exhaust gas to a heat exchanger through which coolant flows, and conducts heat exchange between exhaust gas and coolant.

Further, the exhaust heat recovery apparatus opens the main flow passage of exhaust gas by the exhaust flap when the coolant is warmed up enough, and emits the exhaust gas to outside through the main flow passage of exhaust gas without exchanging heat with the coolant.

This exhaust heat recovery apparatus is installed between the warm-up catalytic converter and the muffler in the conventional technology. Accordingly, in the conventional technology, a distance between an engine cooling system and an exhaust heat recovery apparatus becomes large and a cooling line becomes long. This may produce interference among coolant lines and surrounding components and shortage of space of installing coolant lines. Therefore, this may result in a bad package layout.

Further, in the conventional technology, since the exhaust heat recovery apparatus is installed remotely from the engine cooling system, lengths of the coolant lines may increase, heat loss may occur through the coolant lines, and efficiency of heat exchange between exhaust gas and coolant may be deteriorated.

The above information disclosed in this Background section is only for enhancement of understanding of the background of the disclosure and therefore it may contain information that does not form the prior art that is already known in this country to a person of ordinary skill in the art.

SUMMARY

The present disclosure provides an exhaust heat recovery apparatus located near the engine (i.e., installed proximate the engine) so as to increase heat efficiency.

Further, the exemplary embodiments of the present disclosure includes a bellows structure to reduce heat loss of coolant, improve efficiency of heat exchange between exhaust gas and coolant, and improve efficiency of warm-up of coolant. Further, noise and vibration according to emitting exhaust gas may be efficiently absorbed.

An exhaust heat recovery apparatus according to an exemplary embodiment of the present disclosure is installed proximate an engine and at a front side of a warm-up catalytic converter in an exhaust system, where the exhaust system includes an exhaust line connected with the engine, and the warm-up catalytic converter is installed at the exhaust line. The exhaust heat recovery apparatus may include a bellows unit which is of a dual-pipe type and exchanges heat between exhaust gas emitted through the exhaust line and coolant circulating from cooling system to the engine.

Further, an exhaust heat recovery apparatus according to an exemplary embodiment of the present disclosure may further include an interlock tube connected with the exhaust line inside the bellows unit.

Further, in an exhaust heat recovery apparatus according to an exemplary embodiment of the present disclosure, the bellows unit may include an inner bellows installed to surround an outside of the interlock tube, and an outer bellows installed to surround an outside the inner bellows.

Further, in an exhaust heat recovery apparatus according to an exemplary embodiment of the present disclosure, the bellows unit may include an exhaust gas flow passage selectively connected with an exhaust gas main flow passage in the interlock tube between the interlock tube and the inner bellows.

Further, in an exhaust heat recovery apparatus according to an exemplary embodiment of the present disclosure, the bellows unit may include a coolant flow passage flowing coolant between the inner bellows and the outer bellows.

Further, an exhaust heat recovery apparatus according to an exemplary embodiment of the present disclosure may include i) an interlock tube forming a plurality of bypass holes at both end sides and connected with an exhaust line, ii) an inner bellows installed to surround an outside of the interlock tube and forming an exhaust gas flow passage selectively connected with the bypass holes between the interlock tube and the inner bellows, iii) an outer bellows installed to surround an outside of the inner bellows and forming a coolant flow passage between the inner bellows and the outer bellows, and iv) a valve assembly installed at an exhaust inflow end side and selectively blocking exhaust gas flow in the exhaust gas flow passage through the bypass holes.

Further, the exhaust heat recovery apparatus according to an exemplary embodiment of the present disclosure may be installed proximate the engine and at the exhaust line at a front side of the warm-up catalytic converter in an exhaust system.

Further, the exhaust heat recovery apparatus according to an exemplary embodiment of the present disclosure may further include a braid installed to surround an outer circumference of the outer bellows.

Further, in the exhaust heat recovery apparatus according to an exemplary embodiment of the present disclosure, both ends of the inner bellows may be connected with both end sides of the outer bellows.

Further, in the exhaust heat recovery apparatus according to an exemplary embodiment of the present disclosure, porous pipes having the bypass holes may be integrally provided at both ends of the interlock tube.

Further, in the exhaust heat recovery apparatus according to an exemplary embodiment of the present disclosure, extension pipes may be integrally provided at both ends of the outer bellows.

Further, in the exhaust heat recovery apparatus according to an exemplary embodiment of the present disclosure, finishing bushes may be provided between the extension pipe and the porous pipe so as to block both ends of the exhaust gas flow passage.

Further, in the exhaust heat recovery apparatus according to an exemplary embodiment of the present disclosure, a flange may be installed at the extension pipe fixing the braid.

Further, the exhaust heat recovery apparatus according to an exemplary embodiment of the present disclosure may further include an actuator connected with the valve assembly and applying rotational operation force to the valve assembly.

Further, in the exhaust heat recovery apparatus according to an exemplary embodiment of the present disclosure, the valve assembly may include a valve body connected with the actuator, rotating by the actuator and selectively opening and closing an exhaust gas main flow passage in the interlock tube in the porous pipe.

Further, in the exhaust heat recovery apparatus according to an exemplary embodiment of the present disclosure, the valve assembly may include a valve cup having a plurality of connecting holes connected with the exhaust gas main flow passage, movably installed in the porous pipe, and selectively opening and closing the bypass holes.

Further, in the exhaust heat recovery apparatus according to an exemplary embodiment of the present disclosure, the valve assembly may include a valve spring installed between a spring sheet fixed inner circumference of the porous pipe and the valve cup, and contacting the valve cup with the valve body.

Further, in the exhaust heat recovery apparatus according to an exemplary embodiment of the present disclosure, the valve cup may include a first portion having area corresponding cross sectional area of a pipe line of the porous pipe and forming the connection holes, and a second portion formed as a cylinder shape, integrally connected with the first portion and selectively opening and closing the bypass holes.

Further, in the exhaust heat recovery apparatus according to an exemplary embodiment of the present disclosure, the actuator may include a coolant flow passage housing connected with a coolant outlet side of the coolant flow passage and an engine, a wax filling housing accommodating wax shrinking and expanding according to coolant temperature and installed inside the coolant flow passage housing, an operation rod installed at the wax filling housing to repeatedly and linearly move, a rod return spring installed between the wax filling housing and the operation rod, a rotational cam fixed at the valve body and rotating with the valve body by the operation rod, and a cam return spring connected with the rotational cam and the outer bellows side.

Further, in the exhaust heat recovery apparatus according to an exemplary embodiment of the present disclosure, the operation rod may be connected with the rotational cam by a hook member, and a hook protrusion may be provided to the rotational cam to be hook coupled with the hook member.

Further, in the exhaust heat recovery apparatus according to an exemplary embodiment of the present disclosure, the operation rod is provided to contact the rotational cam, and a lever protrusion is provided to the rotational cam to contact the operation rod.

Further, in the exhaust heat recovery apparatus according to an exemplary embodiment of the present disclosure, the actuator may include a cylinder connected with an engine, an operation rod installed at the cylinder to repeatedly and linearly move by negative pressure of the engine, a rod return spring installed between the cylinder and the operation rod, a rotational cam fixed at the valve body and rotating with the valve body by the operation rod, and a cam return spring connected with the rotational cam and the valve body.

Further, in the exhaust heat recovery apparatus according to an exemplary embodiment of the present disclosure, the actuator may include a driving motor connected with the valve assembly.

The exemplary embodiments of the present disclosure provide an exhaust heat recovery apparatus combined with a bellows of the conventional exhaust system to reduce distance between the engine and the exhaust heat recovery apparatus, thereby performance of heat exchange between exhaust gas and coolant may be improved, layout may be improved, and manufacturing cost and weight may be reduced.

Further, the exemplary embodiments of the present disclosure provide an exhaust heat recovery apparatus combined with a bellows of the conventional exhaust system to maximize exhaust gas flow passage to minimize back pressure increase, to maximize heat exchange surface area to reduce heat loss of the coolant, to improve efficiency of heat exchange between the exhaust gas and the coolant and warm-up of the coolant, and to efficiently absorb noise and vibration according to exhaust gas emission.

Further, effects that can be obtained or expected from exemplary embodiments of the present disclosure are directly or suggestively described in the following detailed description. That is, various effects expected from exemplary embodiments of the present disclosure will be described in the following detailed description.

BRIEF DESCRIPTION OF THE DRAWINGS

These drawings are presented to describe exemplary embodiments of the present disclosure, and, thus, the technical spirit of the present disclosure should not be interpreted as being limited to the accompanying drawings.

FIG. 6 is a view illustrating an actuator applied to an exhaust heat recovery apparatus according to an exemplary embodiment of the present disclosure.

DETAILED DESCRIPTION OF THE EMBODIMENTS

Figure 1:
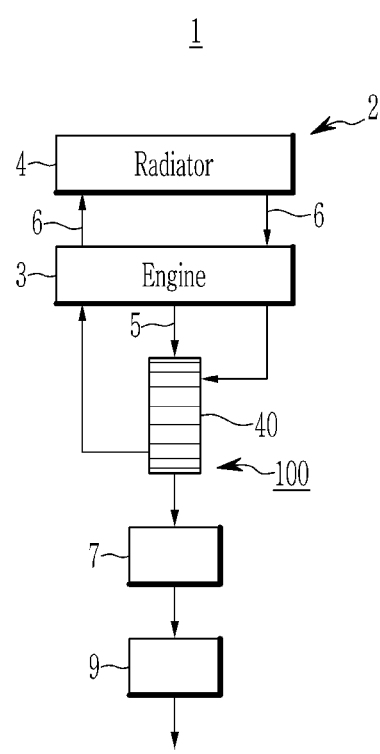
FIG. 1 is a schematic view of an exhaust system for vehicles to which an exhaust heat recovery apparatus according to an exemplary embodiment of the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

FIG. 1 is a schematic view of an exhaust system for vehicles to which an exhaust heat recovery apparatus according to an exemplary embodiment of the present disclosure is applied.

Referring to FIG. 1, an exhaust heat recovery apparatus 100 according to an exemplary embodiment of the present disclosure may be applied to an exhaust system 1 for vehicles for emitting exhaust gas generated from an engine 3 to rear side of the a vehicle body.

The exhaust system 1 for vehicles includes an exhaust line 5 as an exhaust pipe connected with the engine 3, a warm-up catalytic converter 7 installed at the exhaust line 5, and a muffler 9 as a center muffler installed at a rear side of the warm-up catalytic converter 7, as widely known in the corresponding industrial field.

In particular, the warm-up catalytic converter 7 may eliminate harmful components included in exhaust gas at initial engine start such as NOx. Further, the muffler 9 may raise exhaust pressure of the exhaust gas to reduce exhaust noise.

Meanwhile, the engine 3 circulates coolant through cooling system 2, thereby cooling is conducted by the coolant. The cooling system 2 basically includes a radiator 4 and a cooling line 6, as widely known in the corresponding industrial field.

An exhaust heat recovery apparatus according to an exemplary embodiment of the present disclosure is installed at the exhaust line 5 in the exhaust system 1. The exhaust heat recovery apparatus 100 may recover exhaust heat by raising coolant temperature through heat exchange between high temperature exhaust gas generated in combustion process and low temperature coolant during initial cold start.

That is, in the exhaust heat recovery apparatus 100, heat exchange between exhaust gas emitting through the exhaust line 5 and coolant circulating from the cooling system 2 to the engine 3 is conducted, and coolant temperature may be raised during initial cold start.

An exhaust heat recovery apparatus 100 according to an exemplary embodiment of the present disclosure may be installed proximate the engine 3 for improving efficiency of heat exchange at the exhaust line 5 in the exhaust system 1.

In addition, in the exhaust heat recovery apparatus 100 according to an exemplary embodiment of the present disclosure, a bellows structure is applied to reduce heat loss of the coolant, improve efficiency of heat exchange of the coolant and warm-up of the coolant, and efficiently absorb noise and vibration according to emission of the exhaust gas.

In particular, the exhaust heat recovery apparatus 100 according to an exemplary embodiment of the present disclosure may be installed at the exhaust line 5 at a front side of the warm-up catalytic converter 7 so that it is located proximate the engine 3.

Further, the exhaust heat recovery apparatus 100 according to an exemplary embodiment of the present disclosure includes a bellows unit 40 which is of a dual-pipe type and exchanges heat between exhaust gas emitted through the exhaust line 5 and coolant circulating from cooling system 2 to the engine 3.

Figure 2:
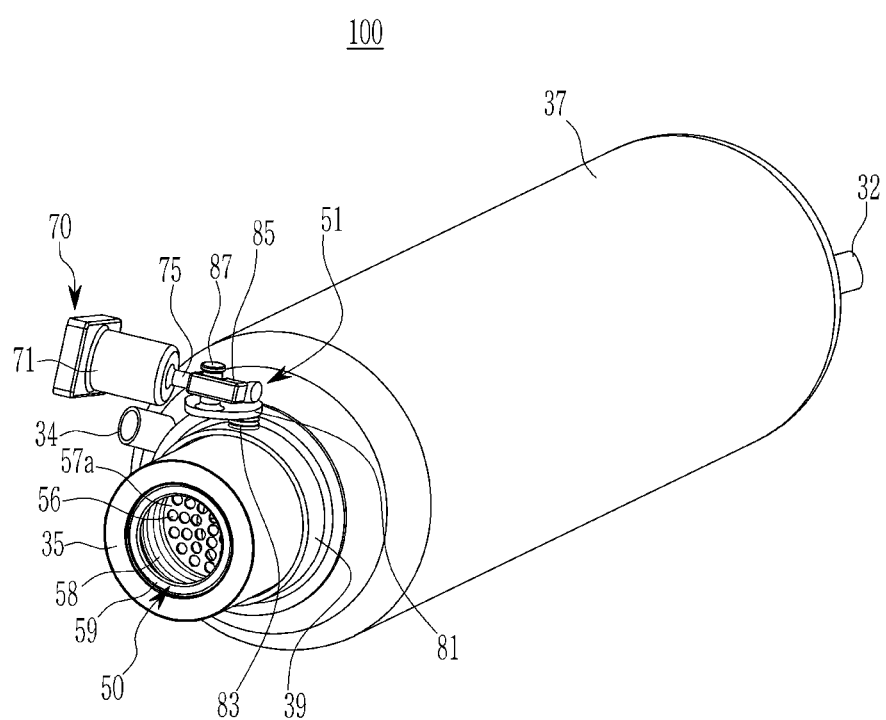
FIG. 2 is a perspective view of an exhaust heat recovery apparatus according to an exemplary embodiment of the present disclosure.
Figure 3:
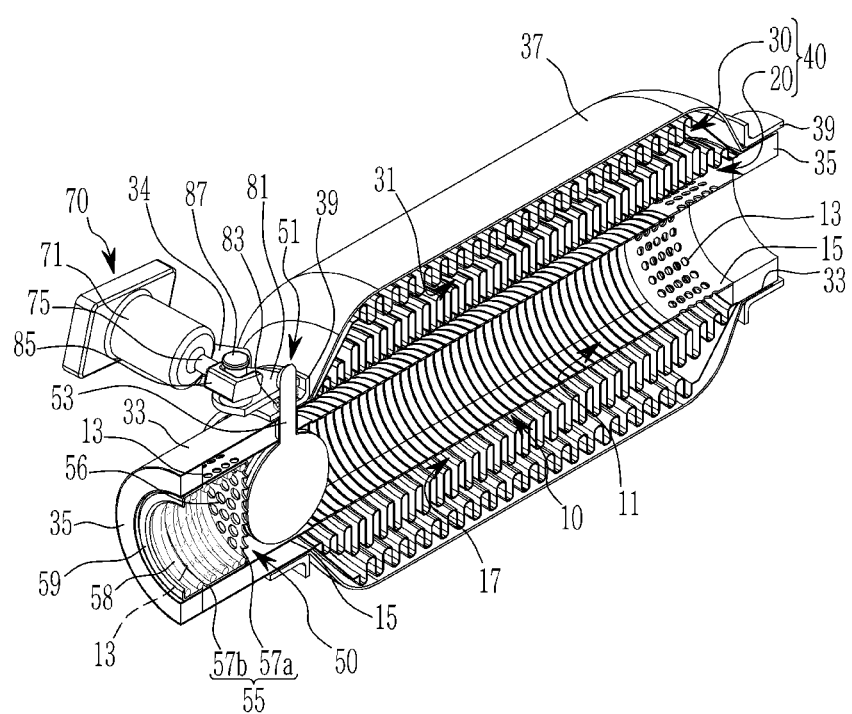
FIG. 3 is a cut perspective view of an exhaust heat recovery apparatus according to an exemplary embodiment of the present disclosure.

FIG. 2 is a perspective view of an exhaust heat recovery apparatus according to an exemplary embodiment of the present disclosure, and FIG. 3 is a cut perspective view of an exhaust heat recovery apparatus according to an exemplary embodiment of the present disclosure.

Referring to FIG. 1 and FIG. 3, the exhaust heat recovery apparatus 100 according to an exemplary embodiment of the present disclosure includes an interlock tube 10, an inner bellows 20 and an outer bellows 30 which are included in the bellows unit 40, a valve assembly 50, and an actuator 70.

In an exemplary embodiment of the present disclosure, the interlock tube 10 is provided as a cylinder and connected with an exhaust line 5 at a front side of the warm-up catalytic converter 7. The interlock tube 10 is made by bending a metal plate material and winding as a spiral shape so that a part of the bending portion becomes interlocking.

At an inner circumference of the interlock tube 10, micro grooves are formed at a constant interval along lengthwise direction. In particular, the interlock tube 10 has an exhaust gas main flow passage 11 connected with the exhaust line 5 in the interlock tube 10.

Porous pipes having bypass holes and a cylinder shape are integrally provided at both ends of the interlock tube 10.

Hereinafter, a porous pipe 15 located at the engine 3 side is referred to one side (left side in drawings) porous pipe, and a porous pipe 15 located at the warm-up catalytic converter 7 side is referred to the other side (right side in drawings) porous pipe.

In particular, the one side porous pipe 15 is located at an exhaust gas inflow end side of the interlock tube 10, and the other side porous 15 is located at an exhaust gas outflow end side.

In an exemplary embodiment of the present disclosure, the inner bellows 20 is a bellows located at an inside of the bellows unit 40 of a dual-pipe type, has a shape of furrow pipe and is installed to surround an outside of the interlock tube 10.

The inner bellows 20 is installed such that an inner circumference of the inner bellows 20 is spaced apart from an outer circumference of the interlock tube 10. Accordingly, the exhaust gas flow passage 17 selectively connected with the bypass holes 13 of the porous pipe 15 is formed between the inner circumference of the inner bellows 20 and the outer circumference of the interlock tube 10.

In an exemplary embodiment of the present disclosure, the outer bellows 30 a bellows located at an outside of the bellows unit 40 of a dual-pipe type, has a shape of furrow pipe and is installed to surround an outside of the inner bellows 20.

The outer bellows is installed such that the inner circumference of the outer bellows 30 is spaced apart from the outer circumference of the inner bellows 20. In particular, both ends of the inner bellows 20 are connected with both ends of the outer bellows 30. Accordingly, the coolant flow passage 31 flowing the coolant is formed between the inner circumference of the outer bellows 30 and the outer circumference of the inner bellows 20.

In particular, extension pipes 33 of cylinder shape are integrally provided at both ends of the outer bellows 30. The extension pipes 33 are disposed with a constant interval at an outside of the porous pipe 15 described above. Also, finishing bushes 35 may be provided between the extension pipe 33 and the porous pipe 15 so as to block both ends of the exhaust gas flow passage 17.

This outer bellows 30 includes a coolant inlet portion 32 in which the coolant inflows into the coolant flow passage 31 and a coolant outlet portion 34 in which the coolant flowing along the coolant flow passage 31 outflows.

The coolant inlet portion 32 is a portion that the coolant circulating from the cooling system 2 to the engine 3 inflows. The coolant outlet portion 34 is a portion connected with the actuator 70 which will be described further afterwards, and discharges the coolant flowing along the coolant flow passage 31 and supplies the coolant to the engine 3.

Further, a braid 37 is installed at an outer circumference of the outer bellows 30. The braid 37 is installed to surround the outer circumference of the outer bellows 30. The braid 37 is weaved by steel having a lattice pattern, and may be a mesh type. This braid 37 may prevent excessive tensional deformation of the outer bellows 30 from heat and protect the outer bellows 30.

Both ends of the braid 37 are fixed at the outer bellows 30. For this, flanges 39 are installed at the extension pipes 33 of the outer bellows 30.

In an exemplary embodiment of the present disclosure, the valve assembly 50 is for selectively blocking exhaust gas flow through the exhaust gas main flow passage 11 of the interlock tube 10 and exhaust gas flow through the exhaust gas flow passage 17 through the bypass holes 13 of the porous pipe 15.

This valve assembly 50 closes the exhaust gas main flow passage 11 of the interlock tube 10, opens the bypass holes 13 of the one side porous pipe 15, and flows the exhaust gas to the exhaust gas flow passage 17 through the bypass holes 13.

Further, the valve assembly 50 may open the exhaust gas main flow passage 11 of the interlock tube 10, close the bypass holes 13 of the one side porous pipe 15, and flow the exhaust gas to the exhaust gas main flow passage 11.

Figure 4:
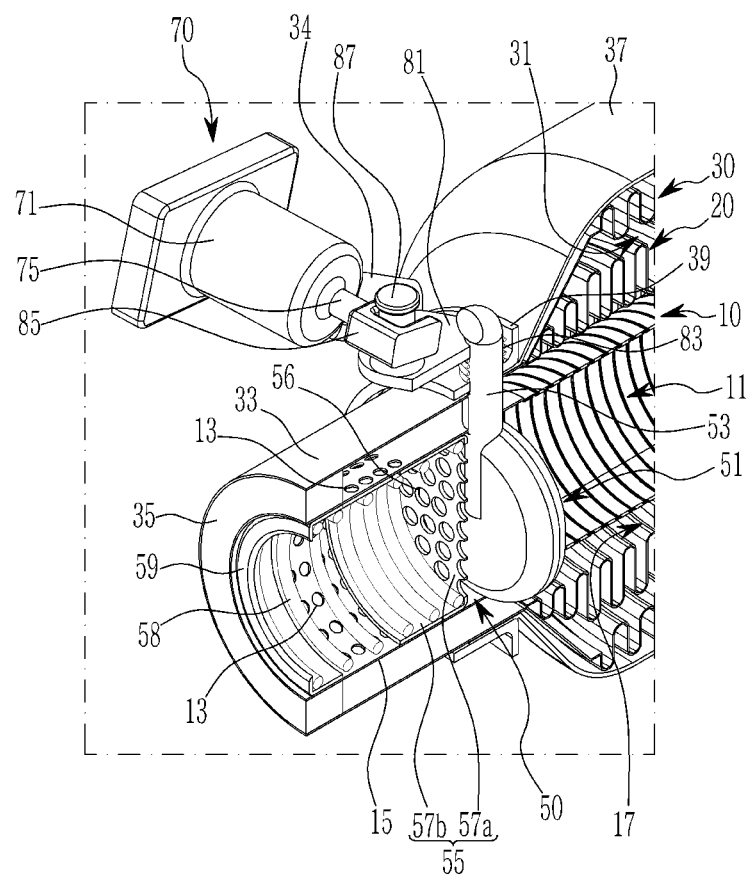
FIG. 4 and FIG. 5 are cutaway views illustrating a valve assembly applied to an exhaust heat recovery apparatus according to an exemplary embodiment of the present disclosure.
Figure 5:
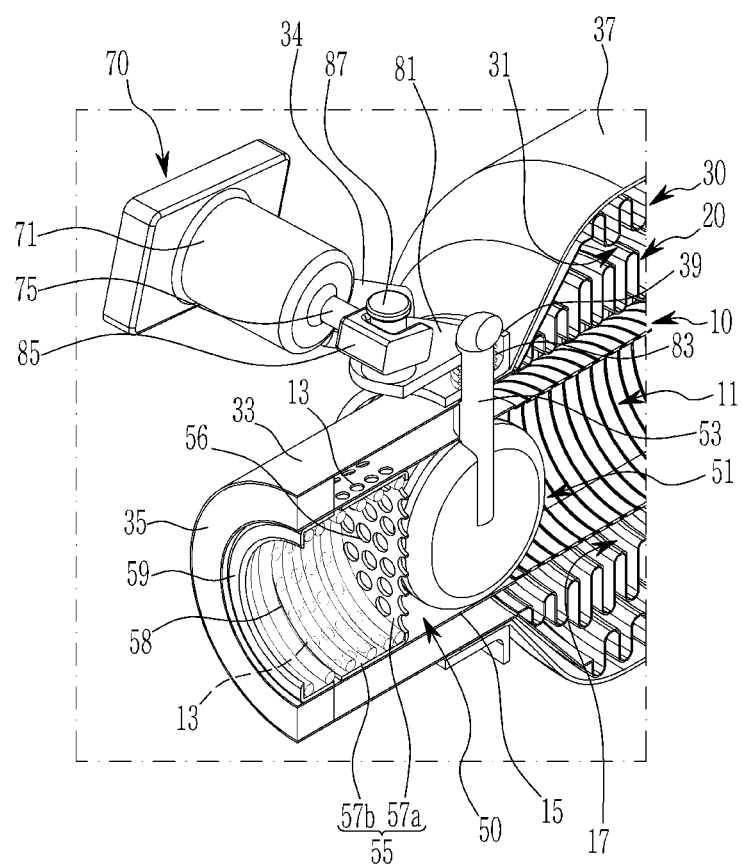

FIG. 4 and FIG. 5 are cutaway views illustrating a valve assembly applied to an exhaust heat recovery apparatus according to an exemplary embodiment of the present disclosure.

Referring to FIG. 4 and FIG. 5, the valve assembly 50 according to an exemplary embodiment of the present disclosure is installed at the one side porous pipe 15 at an exhaust gas inlet end of the interlock tube 10. This valve assembly 50 includes a valve body 51, a valve cup 55, and a valve spring 58.

The valve body 51 is connected with the actuator (70: refer to FIG. 2 and FIG. 3) which will be described further afterwards. The valve body 51 rotates by the actuator 70, and may selectively open and close the exhaust gas main flow passage 11 of the interlock tube 10 inside of the one side porous pipe 15.

This valve body 51 includes a body which is circular plate shape having an area corresponding to cross sectional area of pipe passage. Further, the valve body 51 is integrally connected with the body, penetrates the one side porous pipe 15, the extension pipe 33, and the flange 39, and includes a valve stem 53 protruding toward outside.

In an exemplary embodiment of the present disclosure, the valve cup 55 is for selectively opening and closing the bypass holes 13 of the one side porous pipe 15, includes a plurality of connection holes 56 connected with the exhaust gas main flow passage 11 of the interlock tube 10, and is installed movably inside the one side porous pipe 15.

This valve cup 55 includes a first portion 57a having an area corresponding to cross sectional area of pipe passage of the one side porous pipe 15 and connection holes 56, and a second portion 57b of cylinder shape integrally connected with the first portion 57a and selectively opening and closing the bypass holes 13 of the one side porous pipe 15.

In an exemplary embodiment of the present disclosure, the valve spring 58 is for contacting tightly and elastically the valve cup 55 with the valve body 51 inside the one side porous pipe 15. The valve spring 58 is installed between a spring sheet 59 fixed at an inner circumference of the one side porous pipe 15 and the first portion 57a of the valve cup 55.

The valve assembly 50 rotates the valve body 51 to the one side direction as illustrated in FIG. 4 and closes the exhaust gas main flow passage 11 of the interlock tube 10. Accordingly, the valve cup 55 may be moved toward the valve body 51 by elastic force of the valve spring 58. At this time, the first portion 57a of the valve cup 55 surface contacts with the valve body 51, and the connection holes 56 of the first portion 57a is closed by the valve body 51.

Accordingly, the valve body 51 closes the connection holes 56 of the first portion 57a and the exhaust gas main flow passage 11 of the interlock tube 10. Also, the second portion 57b of the valve cup 55 opens the bypass holes 13 of the one side porous pipe 15. Therefore, in an exemplary embodiment of the present disclosure, the exhaust gas inflowing into the one side porous pipe 15 may be flowed in the exhaust gas flow passage 17 through the bypass holes 13.

Further, the valve assembly 50 rotates the valve body 51 to the one side direction as illustrated in FIG. 5 and opens the exhaust gas main flow passage 11 of the interlock tube 10. Accordingly, the valve cup 55 may be moved away from the valve body 51 by the valve body 51. At this time, the first portion 57a of the valve cup 55 contacts with an edge surface of the valve body 51, and the connection holes 56 of the first portion 57a is opened by the valve body 51. Further, the valve cup 55 compresses the valve spring 58 by the valve body 51 and is moved away from the valve body 51.

Accordingly, the valve body 51 opens the connection holes 56 of the first portion 57a and the exhaust gas main flow passage 11 of the interlock tube 10. Also, the second portion 57b of the valve cup 55 closes the bypass holes 13 of the one side porous pipe 15. Therefore, in an exemplary embodiment of the present disclosure, the exhaust gas inflowing into the one side porous pipe 15 may be flowed in the exhaust gas main flow passage 11 of the interlock tube 10.

Referring to FIG. 2 and FIG. 3, in an exemplary embodiment of the present disclosure, the actuator 70 is for applying rotational force to the valve body 51 of the valve assembly 50. In an exemplary embodiment of the present disclosure, the actuator 70 is provided as a wax actuator connected with the valve assembly 50.

FIG. 6 is a view illustrating an actuator applied to an exhaust heat recovery apparatus according to an exemplary embodiment of the present disclosure.

Referring to FIG. 6, in an exemplary embodiment of the present disclosure, the actuator 70 includes a coolant flow passage housing 71, a wax filling housing 73, an operation rod 75, a rod return spring 77, and a rotational cam 81.

The coolant flow passage housing 71 is connected with a coolant outlet 34 of the coolant flow passage 31 and an engine 3. The coolant flow passage housing 71 may flow the coolant discharged from the coolant flow passage 31 to the coolant outlet 34. In other words, the coolant discharged from the coolant flow passage 31 to the coolant outlet 34 may be supplied to the engine 3 through the coolant flow passage housing 71.

The wax filling housing 73 accommodates wax shrinking and expanding according to coolant temperature inflowed into the coolant passage housing 71, and is installed in the coolant passage housing 71.

The operation rod 75 is installed at the wax filling housing 73 to repeatedly and linearly move. The operation rod 75 may move repeatedly and linearly by the wax 74 shrinking and expanding according to temperature of the coolant. In other words, the operation rod 75 advances to one side direction by the wax 74 shrinking and expanding according to temperature of the coolant and retreats to the other side direction.

The rod return spring 77 is installed between the wax filling housing 73 and the operation rod 75. The rod return spring 77 is compressed when the operation rod 75 moves linearly to one side direction by expansion of the wax 74. Also, the rod return spring 77 applies elastic restoring force to the operation rod 75 when the operation rod 75 moves linearly to the other side direction by shrinking of the wax 74.

The rotational cam 81 is fixed at the valve body 51 and rotates with the valve body 51 by the operation rod 75. The valve body 51 is eccentrically fixed at the rotational cam 81.

This rotational cam 81 rotates by the operation rod 75 and rotates the valve body 51 as illustrated in FIG. 4 when the wax 74 shrinks according to temperature of the coolant.

Further, the rotational cam 81 rotates by the operation rod 75 and rotates the valve body 51 as illustrated in FIG. 5 when the wax 74 expands according to temperature of the coolant.

In particular, the rotational cam 81 is connected with the operation rod 75 by a hook type, therefore the operation rod 75 is connected with the rotational cam 81 by a hook member 85. Further, a hook protrusion is provided to the rotational cam 81 to be hook coupled with the hook member 85.

Further, the actuator 70 according to an exemplary embodiment of the present disclosure further includes a cam return spring 83 connected with the rotational cam 81 and the expansion pipe 33 of the outer bellows 30 as illustrated in FIG. 3.

The cam return spring 83 is provided as a torsion spring one end of which is connected with the rotational cam 81, and the other end of which is connected with a flange 39 of the expansion pipe 33. The cam return spring 83 may apply torsion force to of the valve body 51 and the rotational cam 81 in an opposite direction to rotational direction when the valve body 51 rotates by the rotational cam 81.

Figure 7:
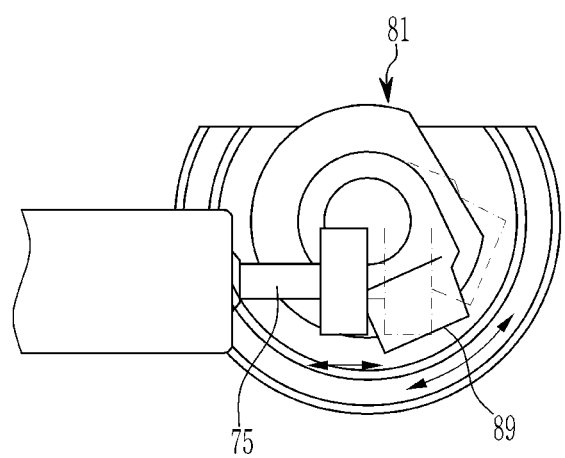
FIG. 7 is a view illustrating exemplary variation of an actuator applied to an exhaust heat recovery apparatus according to an exemplary embodiment of the present disclosure.

Meanwhile, the rotational cam 81 may rotate by a push type by the operation rod 75 as illustrated in FIG. 7. The operation rod 75 is provided to contact with the rotational cam 81, and a lever protrusion 89 is formed to cam contact with the operation rod 75.

Hereinafter, the operation of the exhaust heat recovery apparatus 100 according to the exemplary embodiment of the present disclosure will be described with reference to the drawings described above and the accompanying drawings.

Figure 8:
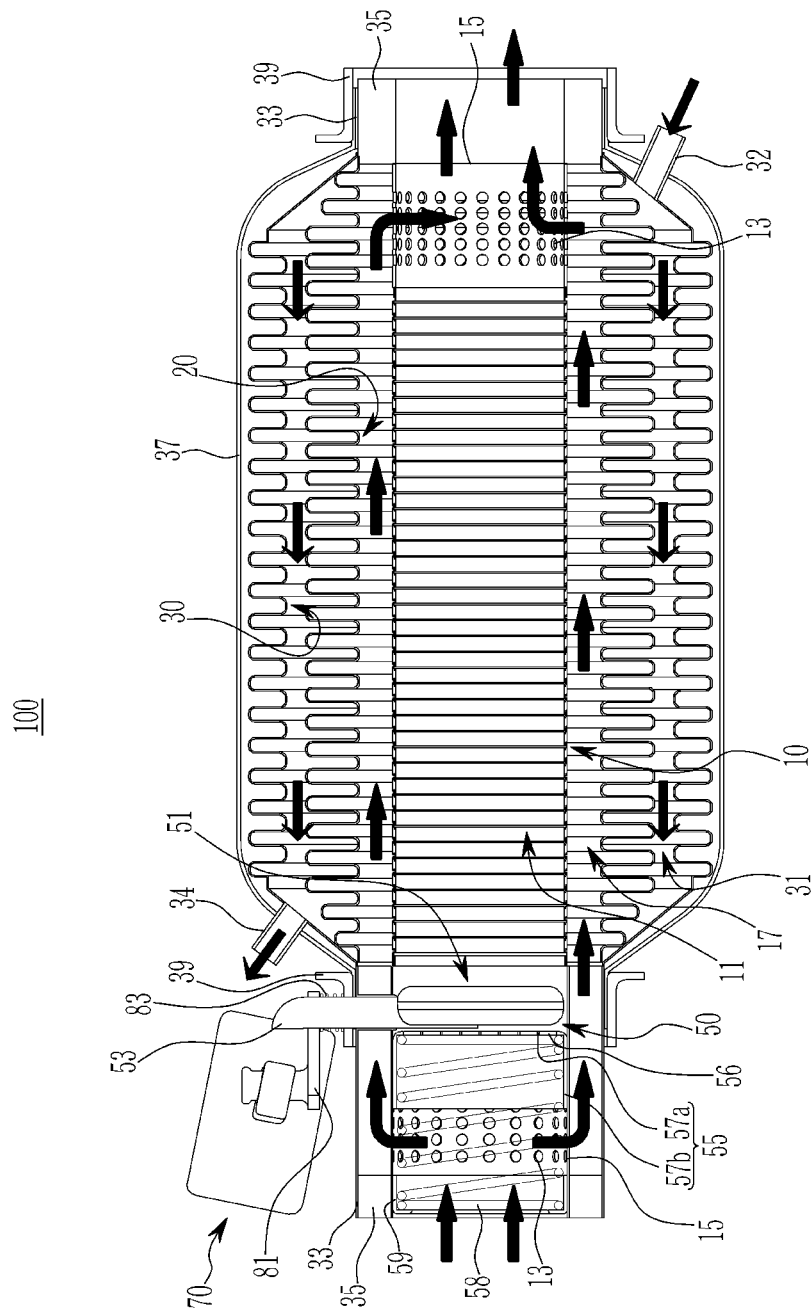
FIG. 8 and FIG. 9 are schematic views describing action of an exhaust heat recovery apparatus according to an exemplary embodiment of the present disclosure.
Figure 9:
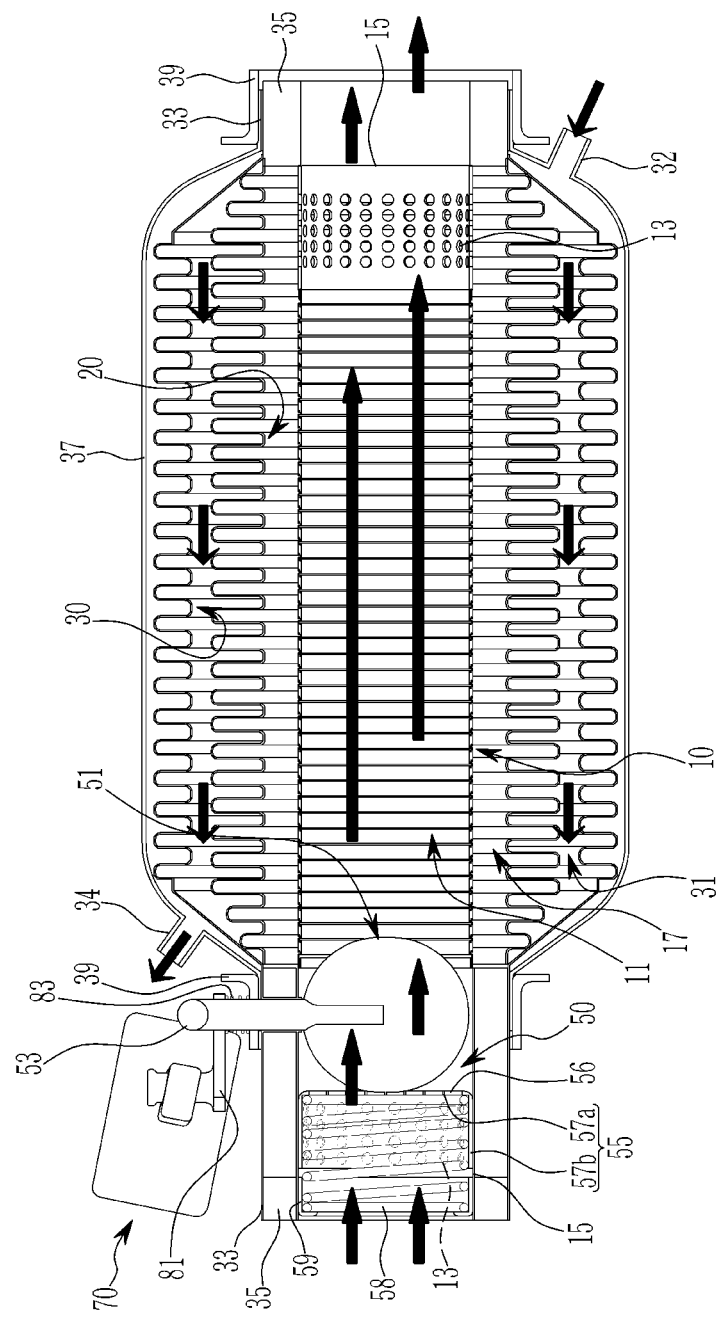

FIG. 8 and FIG. 9 are drawings for describing operation of an exhaust heat recovery apparatus according to an exemplary embodiment of the present disclosure.

Referring to FIG. 8, firstly, the coolant having comparatively low temperature and circulating from the coolant system 2 to the engine 3 inflows into the coolant flow passage 31 between the outer bellows 30 and the inner bellows 20 through the coolant inlet 32 of the outer bellows 30 during initial cold start.

Then, the coolant flows along with the coolant flow passage 31 and is discharged through the coolant outlet 34 of the outer bellows 30, and circulates to the engine 3. At this time, the coolant having comparatively low temperature and being discharged through the coolant outlet 34 is supplied to the engine 3 through the coolant flow passage housing 71 of the actuator 70.

Accordingly, the wax 74 filled in the wax filling housing 73 shrinks by temperature of the coolant, and the operation rod 75 retreats and elastic restoring force of the rod return spring 77 is applied to the operation rod 75.

Accordingly, the rotational cam 81 of the actuator 70 rotates in one side direction by retreat operation of the operation rod 75, and torsion force of the cam return spring 83 applied in an opposite direction of rotation is applied to the rotational cam 81, therefore the rotational cam 81 rotates in one side direction.

As described above, according to rotation of the rotational cam 81 in one side direction, the valve body 51 of the valve assembly 50 rotates in one side direction as illustrated in FIG. 4 and closes the exhaust gas main flow passage 11 of the interlock tube 10.

In this case, the valve cup 55 of the valve assembly 50 moves from inside of the one side porous pipe 15 to the valve body 51 by elastic force of the valve spring 58, the first portion 57a of the valve cup 55 surface contacts with the valve body 51, and the connection holes 56 of the first portion 57a are closed by the valve body 51.

Accordingly, the valve body 51 closes the connection holes 56 of the first portion 57a and the exhaust gas main flow passage 11 of the interlock tube 10. Further, the second portion 57b of the valve cup 55 opens the bypass holes 13 of the one side porous pipe 15.

In this state, the exhaust gas having high temperature generated from combustion process inflows into the one side porous pipe 15 through the exhaust line 5 of the exhaust system.

Then, the valve assembly 50 closes the exhaust gas main flow passage 11 of the interlock tube 10, opens the bypass holes 13 of the one side porous pipe 15. Accordingly, in an exemplary embodiment of the present disclosure, the exhaust gas flows in the exhaust gas flow passage 17 between the inner bellows 20 and the interlock tube 10 through the bypass hole 13.

In particular, the exhaust gas flowing along the exhaust gas flow passage 17 inflows into the inside of the porous pipe 15 through the bypass holes 13 of the other side porous pipe 15, inflows into the exhaust line 5 through the porous pipe 15, and inflows into the warm-up catalytic converter 7 through the exhaust line 5.

In this process, in an exemplary embodiment of the present disclosure, the exhaust gas having comparatively high temperature and flowing along the exhaust gas flow passage 17 and the coolant having comparatively low temperature and flowing along the coolant flow passage 31 exchange heat, therefore, temperature of the coolant may be raised by the exhaust heat of the exhaust gas.

Meanwhile, referring to FIG. 9, in an exemplary embodiment of the present disclosure, the coolant having comparatively high temperature is discharged through the coolant outlet 34 and supplied to the engine 3 through the coolant flow passage housing 71.

In this process, the wax in the wax filling housing 73 expands by temperature of the coolant, accordingly, the operation rod 75 compresses the rod return spring 77 and advances.

Accordingly, the rotational cam 81 rotates in the other side direction by advance operation of the operation rod 75, applies torsion force to the cam return spring 83 in the opposite direction to rotational direction, and rotates.

As described above, according to rotation of the rotational cam 81 in the other side direction, the valve body 51 rotates in the other side direction as illustrated in FIG. 5 and opens the exhaust gas main flow passage 11 of the interlock tube 10.

In this case, the valve cup 55 of the valve assembly 50 compresses the valve spring 58 inside the one side porous pipe 15 and moves away from the valve body 51, the first portion 57a of the valve cup 55 contacts with the edge surface of the valve body 51, and the connection holes 56 of the first portion 57a are opened by the valve body 51.

Accordingly, the valve body 51 opens the connection holes 56 of the first portion 57a and the exhaust gas main flow passage 11 of the interlock tube 10. Further, the second portion 57b of the valve cup 55 closes the bypass holes 13 of the one side porous pipe 15.

Then, the exhaust gas does not inflow into the exhaust gas flow passage 17, inflows along the exhaust gas main flow passage 11 through the one side porous pipe 15, inflows into the exhaust line 5 through the other side porous pipe 15, and inflows into the warm-up catalytic converter 7 through the exhaust line 5.

In other words, in an exemplary embodiment of the present disclosure, the exhaust line 5 and the exhaust gas main flow passage 11 of the interlock tube 10 are opened, and the exhaust gas may inflow into the warm-up catalytic converter 7 without heat exchange with the coolant flowing along the coolant flow passage 31.

The exhaust heat recovery apparatus 100 according to an exemplary embodiment of the present disclosure as described above has a structure combined with a bellows of the conventional exhaust system, and may be disposed at a location neighboring to the engine 3 at a front side of the warm-up catalytic converter 7.

Accordingly, in an exemplary embodiment of the present disclosure, distance between the engine 3 and the exhaust heat recovery apparatus 100 is reduced to improve performance of heat exchange between the exhaust gas and the coolant, minimize heat loss through the coolant line, and reduce warm-up time of the engine to improve fuel efficiency.

Further, in an exemplary embodiment of the present disclosure, distance between the engine 3 and the exhaust heat recovery apparatus 100 is reduced and length of the coolant line is reduced, therefore manufacturing cost and weight may be reduced, interference among the coolant lines and surrounding components may be prevented, and the coolant lines may have an improved package layout.

Further, the exemplary embodiments of the present disclosure provide an exhaust heat recovery apparatus combined with a bellows of the conventional exhaust system to reduce manufacturing cost and weight, and the package may have an improved package layout.

Further, in an exemplary embodiment of the present disclosure, heat exchange between the exhaust gas and the coolant is performed by the bellows unit 40 which is of a dual-pipe type, therefore, the exhaust gas flow passage is maximized to minimize back pressure increase, heat exchange surface area is maximized to reduce heat loss of the coolant, and efficiency of heat exchange between the exhaust gas and the coolant and warm-up of the coolant may be improved.

Further, in the exhaust heat recovery apparatus 100 according to an exemplary embodiment of the present disclosure, heat exchange between the exhaust gas and the coolant is conducted by the bellows unit 40 which is of a dual-pipe type, therefore noise and vibration according to exhaust gas emission may be efficiently absorbed.

Figure 10:
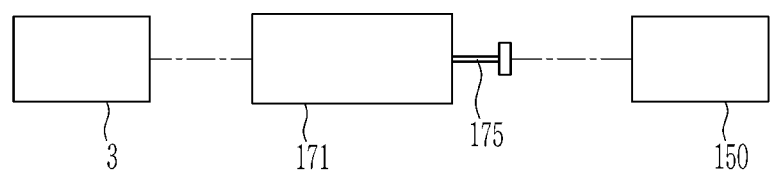
FIG. 10 and FIG. 11 are views illustrating other exemplary variations of an actuator applied to an exhaust heat recovery apparatus according to an exemplary embodiment of the present disclosure.
Figure 11:
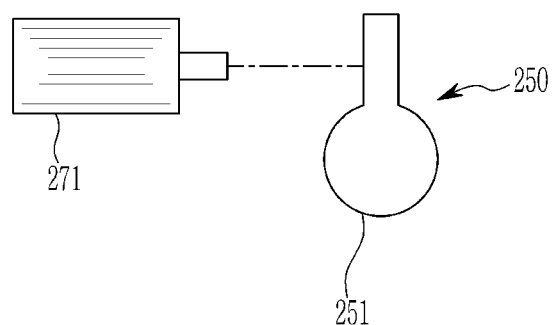

FIG. 10 and FIG. 11 are views illustrating other exemplary variations of an actuator applied to an exhaust heat recovery apparatus according to an exemplary embodiment of the present disclosure.

Referring to FIG. 10, the other exemplary variation of an actuator 170 according to an exemplary embodiment of the present disclosure may be an actuator which is an engine negative pressure type. This actuator 170 may apply rotational operation force to the valve assembly 150 by negative pressure of the engine 3.

In particular, the actuator 170 includes a cylinder 171 connected with the engine 3, and an operation rod 175 installed at the cylinder 171 to repeatedly and linearly move by the negative pressure of the engine 3.

Further, the actuator 170 may further include a rod spring 77, a rotational cam 81 as illustrated in FIG. 6, and a cam return spring 83 as illustrated in FIG. 3.

Accordingly, in the exemplary variation, the operation rod 175 advances and retreats by the negative pressure of the engine 3, and rotational operation force may be applied to the valve assembly 150 by the rod return spring 77, the rotational cam 81, and the cam return spring 83.

Referring to FIG. 11, another exemplary variation of an actuator 270 according to an exemplary embodiment of the present disclosure may be an actuator which is a motor type. This actuator 270 may apply rotational operation force to the valve assembly 250 by a driving motor 271.

The drive motor 271 is connected with the valve assembly 250, and connected with the valve body 251 of the valve assembly 250.

Accordingly, in the exemplary variation, rotational operation force may be applied to the valve body 251 of the valve assembly 250 by the driving motor 271.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An exhaust heat recovery apparatus, comprising:
   an interlock tube forming a plurality of bypass holes at both end sides and connected with an exhaust line;
   an inner bellows installed to surround an outside of the interlock tube and forming an exhaust gas flow passage selectively connected with the plurality of bypass holes between the interlock tube and the inner bellows;
   an outer bellows installed to surround an outside of the inner bellows and forming a coolant flow passage between the inner bellows and the outer bellows; and
   a valve assembly installed at an exhaust inflow end side of the interlock tube and selectively blocking exhaust gas flow in the exhaust gas flow passage through the plurality of bypass holes.

2. The exhaust heat recovery apparatus of claim 1, wherein:
   in the exhaust heat recovery apparatus includes an exhaust system including an exhaust line connected with an engine, and a warm-up catalytic converter installed at the exhaust line, the exhaust heat recovery apparatus is installed proximate the engine and at the exhaust line at a front side of the warm-up catalytic converter.

3. The exhaust heat recovery apparatus of claim 1, further comprising:
   a braid installed to surround an outer circumference of the outer bellows.

4. The exhaust heat recovery apparatus of claim 1, wherein:
   both ends of the inner bellows are connected with both end sides of the outer bellows, and
   porous pipes having the plurality of bypass holes are integrally provided at both side ends of the interlock tube.

5. The exhaust heat recovery apparatus of claim 4, wherein:
   extension pipes are integrally provided at both ends of the outer bellows, and
   finishing bushes are provided between the extension pipes and the porous pipes and blocks both ends of the exhaust gas flow passage.

6. The exhaust heat recovery apparatus of claim 1, wherein:
   extension pipes are integrally provided at both ends of the outer bellows,
   a braid is installed at an outer circumference of the outer bellows, and
   a flange is installed at the extension pipes fixing the braid.

7. The exhaust heat recovery apparatus of claim 1, further comprising:
   porous pipes forming the plurality of bypass holes are integrally provided at both side ends of the interlock tube, and
   an actuator connected with the valve assembly and applying rotational operation force to the valve assembly.

8. The exhaust heat recovery apparatus of claim 7, wherein the valve assembly includes a valve body connected with the actuator, rotating by the actuator and selectively opening and closing an exhaust gas main flow passage in the interlock tube in the porous pipes.

9. The exhaust heat recovery apparatus of claim 8, wherein the valve assembly includes:
   a valve cup having a plurality of connecting holes connected with the exhaust gas main flow passage, movably installed in the porous pipe, and selectively opening and closing the plurality of bypass holes, and
   a valve spring installed between a spring sheet fixed inner circumference of the porous pipes and the valve cup, and contacting the valve cup with the valve body.

10. The exhaust heat recovery apparatus of claim 9, wherein the valve cup includes:
    a first portion having area corresponding cross sectional area of the porous pipes and forming the plurality of connection holes, and
    a second portion formed as a cylinder shape, integrally connected with the first portion and selectively opening and closing the plurality of bypass holes.

11. The exhaust heat recovery apparatus of claim 8, wherein the actuator includes:
    a coolant flow passage housing connected with a coolant outlet side of the coolant flow passage and an engine,
    a wax filling housing accommodating wax shrinking and expanding according to coolant temperature and installed inside the coolant flow passage housing, an operation rod installed at the wax filling housing to repeatedly and linearly move, a rod return spring installed between the wax filling housing and the operation rod, a rotational cam fixed at the valve body and rotating with the valve body by the operation rod, and a cam return spring connected with the rotational cam and an outer bellows side.

12. The exhaust heat recovery apparatus of claim 11, wherein the operation rod is connected with the rotational cam by a hook member, and a hook protrusion is provided to the rotational cam to be hook coupled with the hook member.

13. The exhaust heat recovery apparatus of claim 11, wherein the operation rod is provided to contact the rotational cam, and a lever protrusion is provided to the rotational cam to contact the operation rod.

14. The exhaust heat recovery apparatus of claim 8, wherein the actuator includes:

a cylinder connected with an engine, an operation rod installed at the cylinder to repeatedly and linearly move by negative pressure of the engine, a rod return spring installed between the cylinder and the operation rod, a rotational cam fixed at the valve body and rotating with the valve body by the operation rod, and a cam return spring connected with the rotational cam and the valve body.

15. The exhaust heat recovery apparatus of claim 8, wherein the actuator includes: a driving motor connected with the valve assembly.

\* \* \* \* \*